April 3, 1962     K. P. BILLNER     3,028,012

FILTER

Filed March 12, 1959

INVENTOR

KARL P. BILLNER

BY *Raymond W. Colton*

ATTORNEY

United States Patent Office 3,028,012
Patented Apr. 3, 1962

3,028,012
FILTER
Karl P. Billner, Philadelphia, Pa.
Filed Mar. 12, 1959, Ser. No. 798,997
5 Claims. (Cl. 210—499)

This invention relates to filters suitable for a wide variety of uses.

Among the uses contemplated are medical, chemical, pharmaceutical, biological, bacteriological and kindred fields, the separation of solids from smoke, engine exhausts, gases and vapors generally, and the filtration of a variety of liquids including water supplies.

As set forth in copending application Serial No. 620,140, filed on November 2, 1956, over which this application constitutes an improvement, filtration for such purposes has long relied upon the use of ceramics, earths, natural and synthetic fibers, granules, woven mesh, and felted filaments composed of various materials. It has been proposed to employ permanently deformed spaced filaments composed of such materials as copper in the prior art as represented by the patent to Rubissow, No. 2,271,662, dated February 3, 1942. Filters of these types however, have not been adequate to serve the needs for which they were intended inasmuch as they have not provided the degree of uniformity necessary, particularly where the opening sizes are required to be quite small.

The present invention involves a principle which is in itself well known, namely, that when a solid body of incompressible material is placed under tension, although its dimensions undergo a change, its volume remains constant. When such a body is placed under tension not exceeding its elastic limit, its cross section will be reduced uniformly. Accordingly, by arranging a plurality of filaments of circular or other desired cross section in contact, parallel with their axes, and applying tension to the filaments while holding their axes in a constant spaced relationship, proximate filaments will define a gap which is uniform throughout its length and whose width is equal to the sum of half the diameter reduction of the proximate filaments resulting from such tension.

By employing conventional wire of 0.004 inch diameter, it becomes quite feasible in accordance with the present invention to produce a filter containing uniform openings of the order of 0.000,001 inch. The filament diameter will vary from such relatively small values to substantially larger ones, depending upon the particular requirements to be met. For municipal water systems for example, filaments of 0.25 inch diameter or even larger would adapt themselves admirably. Moreover, elements having cross sectional configurations other than circular are adapted for use in accordance with the present invention.

It is among the objects of the present invention to provide a filter comprising a plurality of elements of substantially equal unstressed cross section having parallel longitudinal axes lying in a common plane, a frame clamping opposed surface portions of each of the elements at a plurality of spaced locations intermediate its length, the elements being under substantially equal positive tension of a value below their elastic limit but sufficient to increase their lengths and uniformly reduce their cross sections, proximate elements defining uniform gaps, each gap having a dimension normal to the axes less than that of one of the elements and equal to the sum of half the dimensional reduction normal to the axes of the proximate elements resulting from the tension. It is contemplated that each of the elements be clamped by the frame at locations not exceeding sixty-five times the cross sectional dimension of one of the elements measured in a direction parallel to the common plane of the element axes.

In a preferred form of the invention, the elements have circular cross sections. Also in accordance with a preferred form of the invention, the frame comprises an inlet member engaging surface portions of each of the elements, a discharge member engaging opposed surface portions of each of the elements, and clamping means maintaining the members in binding engagement with the elements. One of such members preferably contains parallel grooves spaced by a dimension equal to the unstressed diameter of one of the elements for receiving the elements and each of the grooves has a depth less than the diameter of one of the elements which in this case are preferably circular in cross section. One of the members constituting the clamping means preferably has substantially plane surface portions engaging the elements. Both of the members constituting the frame are preferably formed with a plurality of spaced parallel abutments engaging opposite surfaces of the elements at the plurality of spaced locations.

A more complete understanding of the invention will follow a description of the drawings wherein.

Figure 2:
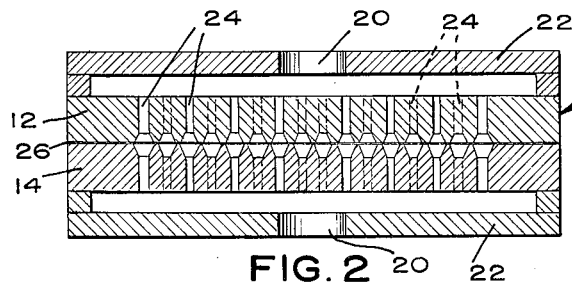
FIG. 2 is a section taken along line 2—2 of FIG. 1.
Figure 5:
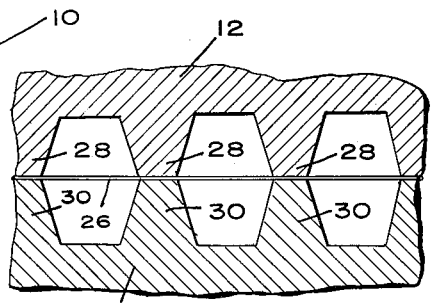
FIG. 5 is a fragmentary sectional elevation showing another detail, also on an enlarged scale.
Figure 3:
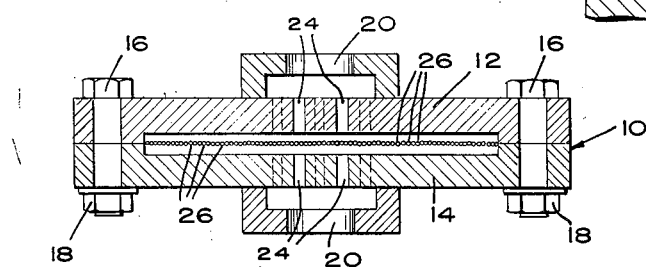
FIG. 3 is a section taken along line 3—3 of FIG. 1.

In the form of the invention depicted by the drawings, a frame 10 is composed of an upper member 12 and a lower member 14, as viewed in FIGS. 2 and 3, secured together by means of a plurality of bolts 16 and nuts 18. One of the members will serve as an inlet member and the other as a discharge member, each being provided with a port 20 for the passage of fluid to and from the filter. The members are provided with manifolds 22 containing the ports 20 so that the fluids to be filtered can be distributed over and collected from the entire active surface of the device. Assuming that the upper member 12 is the inlet member, fluid to be filtered will be introduced into its manifold 22 through the upper port 20 whereupon it will pass through openings 24 towards filter elements 26, depicted in the drawings as filaments of circular cross section which have been placed under tension and clamped between the members 12 and 14 by means of the bolts 16 and nuts 18.

Initially, the filaments or elements 26 are arranged in side by side relationship with their axes lying in a common plane. The elements are then subjected to uniform tension so as to increase their length and uniformly reduce their cross sections until the gaps between proximate elements assume the desired dimensions. Then the clamping action is effected and the elements are clamped under tension, within their elastic limits.

It has been found that where the span assigned to such filter elements exceeds a predetermined value, there is a tendency for certain of the proximate elements to move apart under the pressure of fluid to be filtered, unduly increasing the gap between such proximate elements and thereby disturbing the desired uniformity of the filter as an entirety.

To obviate this condition, the opposed surfaces of the members 12 and 14 are provided with registering abutments 28 and 30 respectively, for engaging opposed surface portions of the elements 26 so as to provide each of them with a plurality of supports at spaced locations intermediate its length. It has been found that the distance between abutments should not exceed sixty-five times the cross sectional dimension of one of the elements measured in a direction parallel to the plane of the longitudinal axes of the elements.

Figure 1:
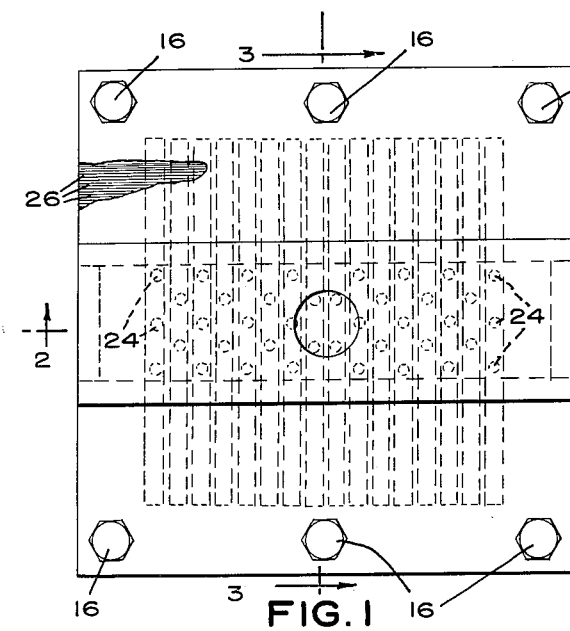
FIG. 1 is a plan view, partially broken away of a filter embodying the present invention.
Figure 4:
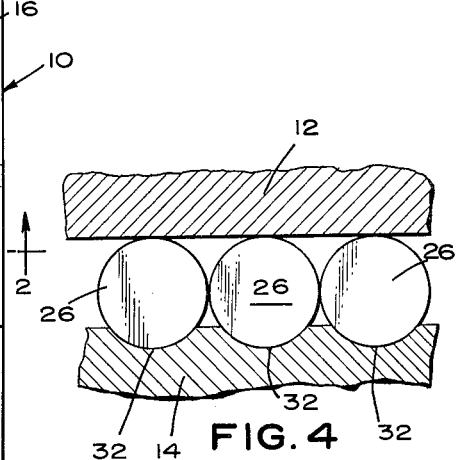
FIG. 4 is a fragmentary sectional elevation showing a detail on an enlarged scale.

As depicted in FIG. 4, one of the members, such as the lower member 14 is preferably formed with grooves 32 whose spacing is equal to the untensioned diameter of the circular section of a filament 26. This arrangement assists greatly in the assembly of the filter since the filaments can be laid in side-by-side contacting engagement as depicted in FIG. 4. The engaging surface of the upper member, such as the member 12 of FIG. 4 is preferably not grooved so that its plane surfaces will urge the filaments into their grooves when the clamping is effected. With the parts in the positions depicted in FIG. 4, but before the clamping action is effected, the filaments will be subjected to uniform stress until their contacting surfaces become mutually spaced to the desired degree, within the elastic limit of the filaments of course, whereupon, while the tension is maintained, the members 12 and 14 will be clamped together to hold the elements in their required spacing. Thereupon, the tensioning force can be discontinued and the projecting ends of the filaments removed in a suitable manner.

With commercially available wire having a diameter of 0.004 inch it has become quite feasible by virtue of the present invention to produce filters having uniform openings of the order of 0.000,001 inch. Assuming that the stress $f$ to be applied to a steel wire is 20,000 lbs. per sq. in., its modulus of elasticity E being approximately 30,000,000 and the length L of the filaments constituting the filter to be 10 inches, then:

$$t = L\frac{f}{E}$$

The volume of such a filament can then be expressed as:

$$0.004^2 \times 10 \times \frac{\pi}{4} = V$$

If $d$ represents the diameter of each filament after subjected to tension and $t$ is the amount of elongation as in the equation above, then the volume can also be expressed as:

$$d^2 \times (10+t) \times \frac{\pi}{4} = V$$

Solving these equations we have first:

$$t = \frac{10 \times 20000}{30,000,000} = 0.0066 \text{ inch}$$

And substituting this value for $t$ in:

$$0.004^2 \times 10 \times \frac{\pi}{4} = d^2 (10+0.0066) \times \frac{\pi}{4}$$

and solving for $d$ it is found that it has a value of 0.003999, which, subtracted from the initial diameter of 0.004, gives a value of 0.000,001 inch as the spacing between adjacent filaments.

The invention is also applicable where the elements are of relatively large diameter even though the gaps themselves are quite fine. Assuming a wire having a diameter of 0.125 inch and a modulus of elasticity of 30,000,000, its elongation for a 10 lb. per sq. in. stress where the wire is 12 inches long, will be 0.000,004 inch. The diameter of each of these wires will then measure 0.12495 inch producing a filter having a gap of 0.000,05 inch.

It will be evident to those skilled in the art that other values can be selected for the spacing between adjacent filaments and for the length and cross sectional dimensions of the filaments themselves without departing from the principles of this invention. The compositions of the filaments can also vary within reasonable limits, although it is preferable that there be substantial freedom from corrosion. Glass and many metallic alloys having relatively high elastic limits and resisting permanent deformation are eminently suited for the purposes of this invention.

Whereas the description has been directed to a specific example depicted in the drawings, variations will occur to those skilled in the art as they have already occurred to applicant and accordingly, the invention should not be limited beyond the scope of the appended claims.

I claim:

1. A filter comprising a plurality of elements of substantially equal unstressed cross section having parallel longitudinal axes lying in a common plane, a frame frictionally clamping opposed surface portions of each of said elements against all relative movement at at least three spaced locations along its length, said elements being under substantially equal positive tension of a value below their elastic limit but sufficient to increase their lengths and uniformly reduce their cross sections, proximate elements defining uniform gaps, each gap having a dimension normal to said axes less than that of one of said elements and equal to the sum of half the dimensional reduction normal to said axes of said proximate elements resulting from said tension; said frame comprising an inlet member engaging surface portions of each of said elements, a discharge member engaging opposed surface portions of each of said elements, and clamping means maintaining said members in binding engagement with said elements; said elements being circular in cross section, one of said members containing parallel grooves receiving said elements and each of said grooves having a depth less than the diameter of one of said elements.

2. A filter comprising a plurality of elements of substantially equal unstressed cross section having parallel longitudinal axes lying in a common plane, a frame frictionally clamping opposed surface portions of each of said elements against all relative movement at at least three spaced locations along its length, said elements being under substantially equal positive tension of a value below their elastic limit but sufficient to increase their lengths and uniformly reduce their cross sections, proximate elements defining uniform gaps, each gap having a dimension normal to said axes less than that of one of said elements and equal to the sum of half the dimensional reduction normal to said axes of said proximate elements resulting from said tension; said frame comprising an inlet member engaging surface portions of each of said elements, a discharge member engaging opposed surface portions of each of said elements, and clamping means maintaining said members in binding engagement with said elements; said members being formed with a plurality of spaced parallel abutments engaging opposite surfaces of said elements at said spaced locations.

3. A filter as set forth in claim 2 wherein each of said elements is clamped by said frame at locations not exceeding sixty-five times the cross sectional dimension of one of said elements measured in a direction parallel to said plane.

4. A filter as set forth in claim 2 wherein each of said elements has a circular cross section.

5. A filter as set forth in claim 2 wherein one of said members has substantially plane surface portions engaging said elements.

References Cited in the file of this patent

UNITED STATES PATENTS

| | | |
|---|---|---|
| 463,410 | Weaver | Nov. 17, 1891 |
| 864,507 | Brunotte | Aug. 27, 1907 |
| 1,308,998 | Stone | July 8, 1919 |
| 1,615,559 | Tark | Jan. 25, 1927 |
| 1,885,762 | Polushkin | Nov. 1, 1932 |
| 2,006,405 | Monroe | July 2, 1935 |
| 2,271,662 | Rubissow | Feb. 3, 1942 |
| 2,837,210 | Ackert | June 3, 1958 |
| 2,839,197 | Nordell | June 17, 1958 |
| 2,907,404 | Mare | Oct. 6, 1959 |